(12) United States Patent
Alghouli (10) Patent No.: US 6,769,596 B1
(45) Date of Patent: Aug. 3, 2004

(54) METHOD AND SYSTEM FOR REWORKING BALL GRID ARRAYS

(75) Inventor: Muwaffaq Alghouli, Tustin, CA (US)

(73) Assignee: Qlogic Corporation, Aliso Viejo, CA (US)

( * ) Notice: Subject to any disclaimer, the term of this patent is extended or adjusted under 35 U.S.C. 154(b) by 0 days.

(21) Appl. No.: 10/295,976

(22) Filed: Nov. 15, 2002

(51) Int. Cl.[7] .......................... B23K 31/02; B23K 37/00
(52) U.S. Cl. ........................ 228/119; 228/41; 228/246
(58) Field of Search ............................ 228/245, 246, 228/180.22, 119, 191, 264, 41

(56) References Cited

U.S. PATENT DOCUMENTS

| | | | |
|---|---|---|---|
| 5,392,980 A | | 2/1995 | Swamy et al. ............... 228/119 |
| 5,867,260 A | * | 2/1999 | Sakai ....................... 356/237.3 |
| 5,890,283 A | * | 4/1999 | Sakemi et al. ................ 29/840 |
| 6,462,533 B1 | * | 10/2002 | Shimizu ................... 324/158.1 |
| 6,533,163 B2 | * | 3/2003 | Saso ........................... 228/246 |
| 6,541,364 B2 | * | 4/2003 | Mukuno et al. ............. 438/612 |
| 6,604,673 B1 | * | 8/2003 | Bourrieres et al. ......... 228/246 |
| 6,634,545 B2 | * | 10/2003 | Razon et al. ............... 228/246 |
| 2003/0127501 A1 | * | 7/2003 | Cheng et al. ............... 228/246 |

FOREIGN PATENT DOCUMENTS

| | | | |
|---|---|---|---|
| JP | 408300613 A | * | 11/1996 |
| JP | 02001298035 A | * | 10/2001 |
| SG | WO 98/47330 | * | 10/1998 |

* cited by examiner

Primary Examiner—Kiley Stoner
(74) Attorney, Agent, or Firm—T. J. Singh, Klein, O'Neill & Singh, LLP (57) ABSTRACT

A method and apparatus for reworking a Ball Grid Array (BGA) package is provided. The apparatus includes a housing with a solder ball compartment that includes solder balls; a sliding base plate positioned to slide under the solder ball compartment; and a BGA nest for supporting the BGA package and a stencil with a hole. The sliding base plate has a BGA nest holder adapted to receive the BGA nest with the BGA package and the stencil. The sliding base plate with the BGA nest, BGA package and the stencil moves underneath the solder ball compartment such that solder balls are placed on the BGA package through the stencil hole pattern. After the solder balls are placed on the BGA package, the sliding plate with the BGA package and the solder balls move in a second direction away from the solder ball compartment.

12 Claims, 7 Drawing Sheets

METHOD AND SYSTEM FOR REWORKING BALL GRID ARRAYS

BACKGROUND OF THE INVENTION

1. Field of the Invention

The present invention relates to ball grid array packages, more particularly, to an apparatus and method for reworking ball grid array packages.

2. Background

Ball Grid Array (BGA) packages reduce semi conductor package size and pin-to-pin trace gap by integrating more functions and reliability in a single chip. BGA technology is a cross between a pin grid array and a surface mount device. It is similar to a pin grid array except that solder balls attached to a land on the package replace pins. Input/Output (I/O) counts range from 16 to 2400, with the most common falling between 200 and 500 pins. The absence of leads makes the BGA a robust packaging option, which increases manufacturing yield.

BGA packages typically have solder ball-attachment problems due to manufacturing defect, improper end user handling or PCB reclaim processes. Since BGA packages are expensive to discard or replace, there has been an increasing demand for reworking (also referred to herein as "Reballing") damaged BGA packages.

Although BGA packages are extensively used, conventional techniques use inefficient reworking tools and procedures to rework damaged BGA packages.

One such technique is disclosed in U.S. Pat. No. 5,392,980 (Swamy et al). In Swamy et al:

"The process uses a rework tool which comprises a plate including one or more depressions corresponding to the contours of inverted BGA packages. A BGA package to be reworked is placed in a respective depression with what remains of the original solder ball grid facing upward. The residual solder balls are wicked away, thus leaving the BGA package with the pads that the solder balls were attached to being exposed. A stencil with BGA patterns punched into it is then placed over the rework tool and solder paste is screened onto the rework tool so that the solder is deposited on the BGA pads via the openings in the stencil." [U.S. Pat. No. 5,392,980, Abstract]

The techniques disclosed in Swamy et al has disadvantages. For example, solder pastes if not evenly spread affects the quality of the BGA package. Also, the technique does not allow reworking of BGA packages with damaged or defective solder balls.

Yet another common technique used for reworking BGA packages is to cover the BGA package with a stencil having a hole pattern similar to the BGA solder ball pattern. Thereafter, solder balls are manually poured on the stencils so that solder balls drop on the BGA package.

This technique also has disadvantages because manually pouring of solder balls may result in loss of solder balls. Also, manually pouring solder balls is labor intensive.

Therefore, there is need for a method and system for efficiently reworking BGA packages.

SUMMARY OF THE INVENTION

In one aspect of the present invention, an apparatus for reworking a BGA package is provided. The apparatus includes a housing with a solder ball compartment that includes solder balls; a sliding base plate positioned to slide under the solder ball compartment; and a BGA nest for supporting the BGA package and a stencil with a hole pattern similar to a solder ball pattern on the BGA package.

The sliding base plate has a BGA nest holder (at least one depression) adapted to receive the BGA nest with the BGA package and the stencil.

The housing includes a solder base plate that is moved in a first direction by the sliding base plate when the sliding base plate moves underneath the solder base plate in the first direction. The sliding base plate with the BGA nest, BGA package and the stencil is aligned with the solder ball compartment such that solder balls are placed on the BGA package through the stencil hole pattern. After the solder balls are placed on the BGA package, the sliding plate with the BGA package and the solder balls move in a second direction away from the solder ball compartment.

In another aspect of the present invention, a method for reworking a BGA package is provided. The method includes placing the BGA package in the BGA nest; covering the BGA package with the stencil having a hole pattern similar to the solder ball pattern of the BGA package; placing the BGA nest with the BGA package and the stencil in the nest holder; moving the nest holder with the BGA nest, BGA package and the stencil in the first direction underneath the solder ball compartment; and placing solder balls from the solder ball compartment on the BGA package through the hole pattern of the stencil. Thereafter, withdrawing the sliding base plate in the second direction away from the solder base compartment after solder balls are placed on the BGA package.

In one aspect of the present invention, solder balls are not wasted or lost because they are contained in the solder ball compartment.

In another aspect of the present invention, moving the sliding plate is not labor intensive and hence rework of the BGA package is performed efficiently.

This summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same numerals. The illustrated embodiment is intended to illustrate, but not to limit the invention. The drawings include the following figures.

DETAILED DESCRIPTION OF THE PREFERRED EMBODIMENTS

Figure 1:
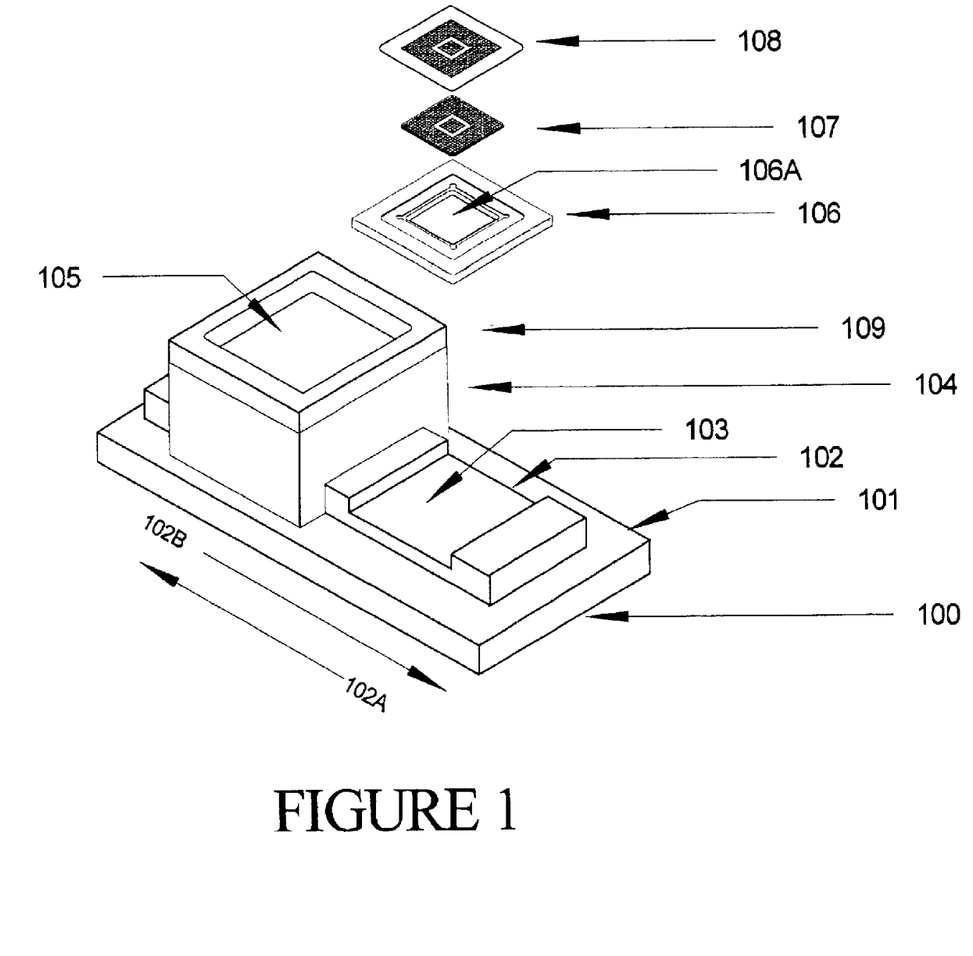
FIG. 1 shows an exploded view of the various components of a system for reworking a BGA package, according to one aspect of the present invention.

FIG. 1 shows an exploded view of system 100 that can efficiently rework damaged BGA package 107. Turning in detail to FIG. 1, system 100 includes a base plate 101 which supports various components including housing 104, and a sliding base plate 102.

Housing 104 includes a solder ball compartment 105 that may be covered by a lid 109, which prevents loss of solder balls 105A (FIG. 6) used for reworking BGA package 107.

Housing 104 also includes an opening 104A (shown in FIG. 2A) through which sliding base plate 102 slides in direction 102A for re-balling, and direction 102B, after re-balling.

Sliding base plate 102 includes a BGA nest holder (a contour or depression or a separate component) 103 that receive a BGA nest 106 for supporting and aligning BGA package 107 during rework. BGA package 107 is placed in BGA nest opening 106A. Stencil 108 with a hole pattern (not shown) similar to a solder ball pattern (not shown) on BGA package 107 is then placed on BGA package 107. Thereafter, BGA nest 106 with BGA package 107 and stencil 108 is placed in BGA nest holder 103.

Sliding base plate 102 with BGA nest 106 is moved in direction 102A, until BGA nest holder 103 is aligned with solder ball compartment 105 which includes solder balls 105A (see FIG. 6) This moves solder ball compartment base 105B in direction 102A and thereafter, solder balls 105A through openings in stencil 108 are placed on BGA package 107. After solder balls 105A are placed on BGA package 107, sliding base plate 102 (with BGA package 107 and solder balls 105A) moves in direction 102B.

Figure 2A:
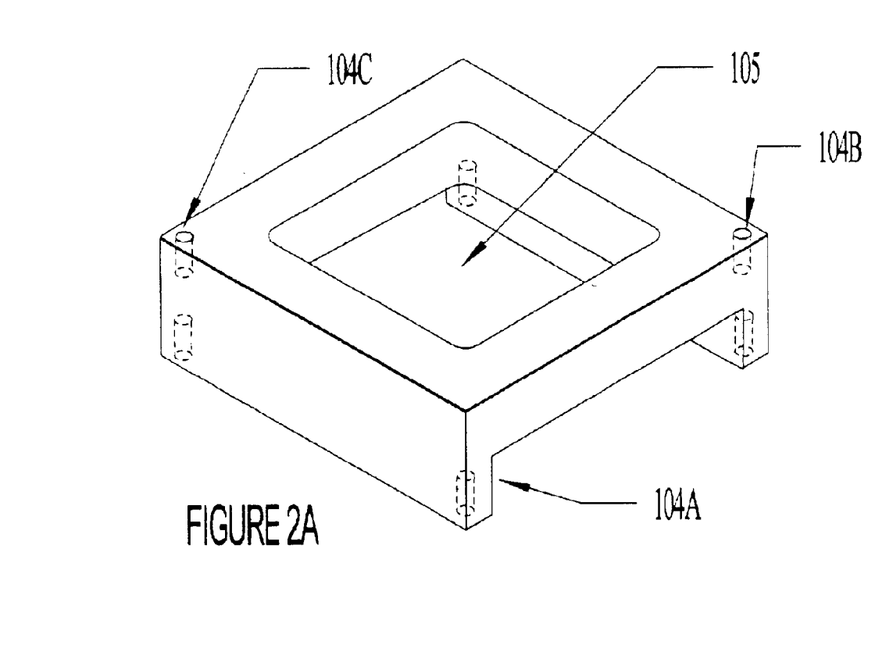
FIG. 2A shows a perspective view of a housing shown in FIG. 1, according to one aspect of the present invention.
Figure 2B:
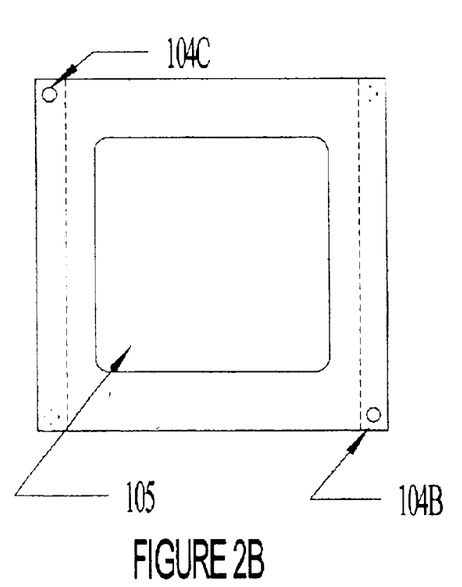
FIG. 2B shows the top view of the housing of FIG. 2A, according to one aspect of the invention.
Figure 2C:
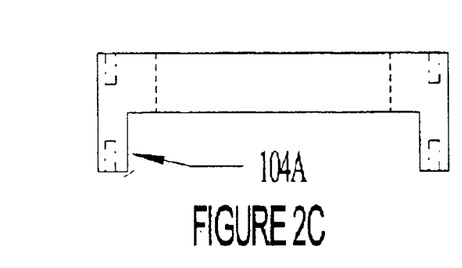
FIG. 2C shows the side view of the housing of FIG. 2A, according to one aspect of the invention.

FIGS. 2A–2C show plural views of housing 104 with solder ball compartment 105, which contain solder balls 105A. Opening 104A is used to accommodate sliding base 102 in both directions 102A and 102B. Orifice 104B and 104C are used for coupling lid 109 on housing 104. Any fastening mechanism may be used to operationally couple lid 109 on housing 104, including without limitation, screws, latches, rivets or any other means.

Figures 3A, 3B:
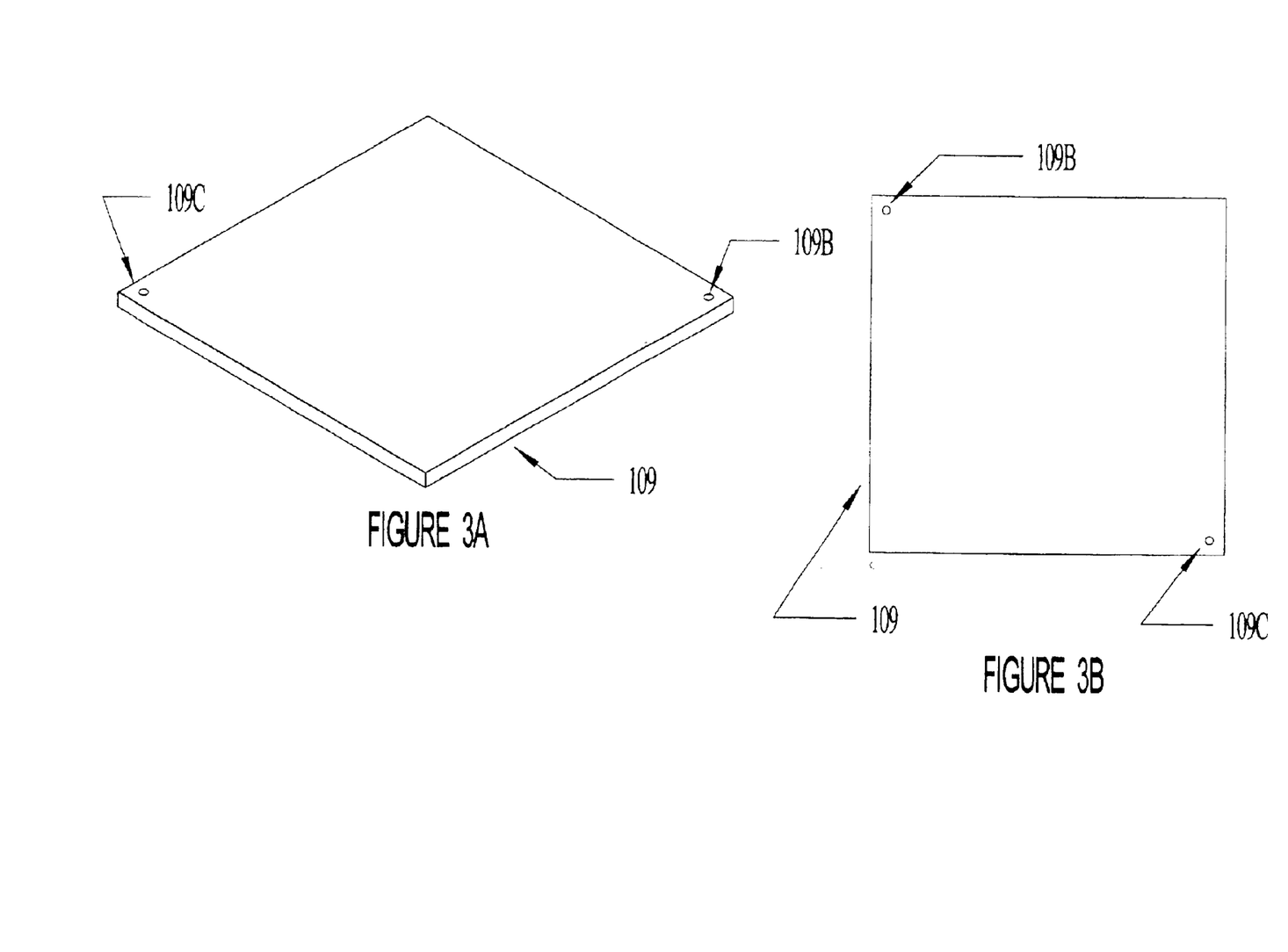
FIG. 3A shows a perspective view of a lid for covering the housing shown above in FIGS. 2A–2C.
FIG. 3B shows a top view of the lid for covering the housing shown above in FIGS. 2A–2C.

FIGS. 3A–3B shows a perspective view and top-view, respectively, of lid 109 with orifices 109B and 109C matching with orifices 104B and 104C, according to one aspect of the present invention.

Figure 4A:
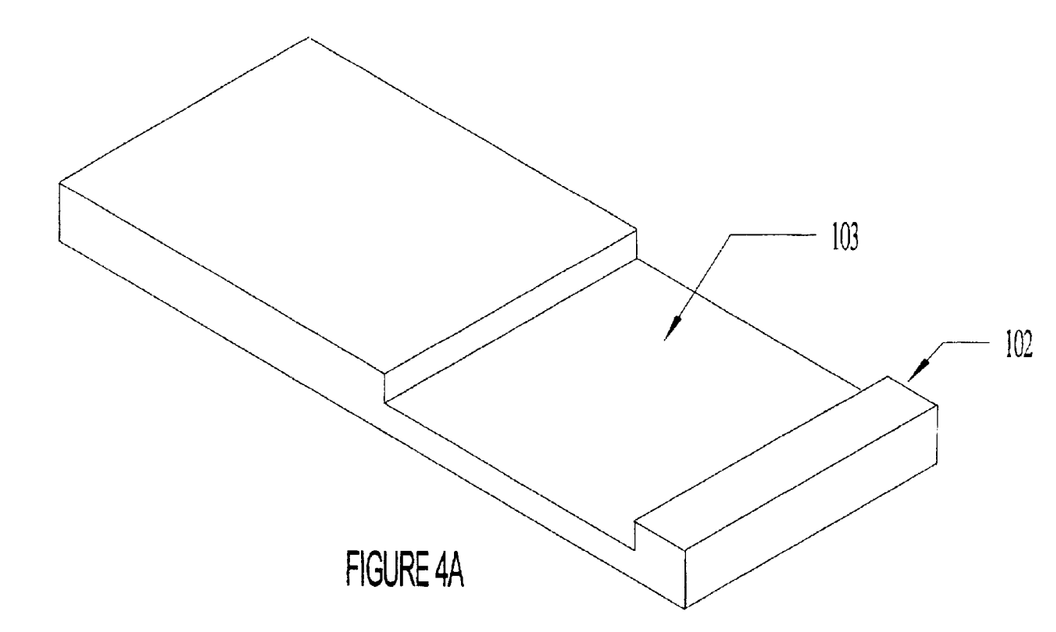
FIG. 4A shows a perspective view of a sliding base plate of the system, according to one aspect of the present invention.
Figure 4B:
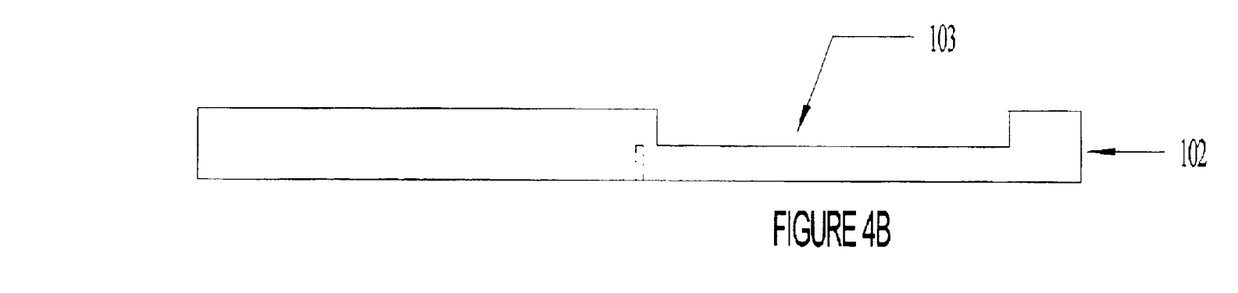
FIG. 4B shows a front view of a sliding base plate of the system, according to one aspect of the present invention.

FIGS. 4A–4B shows a perspective and front view, respectively, of sliding base plate 102 with BGA nest holder 103 that receives BGA nest 106.

Figure 5A:
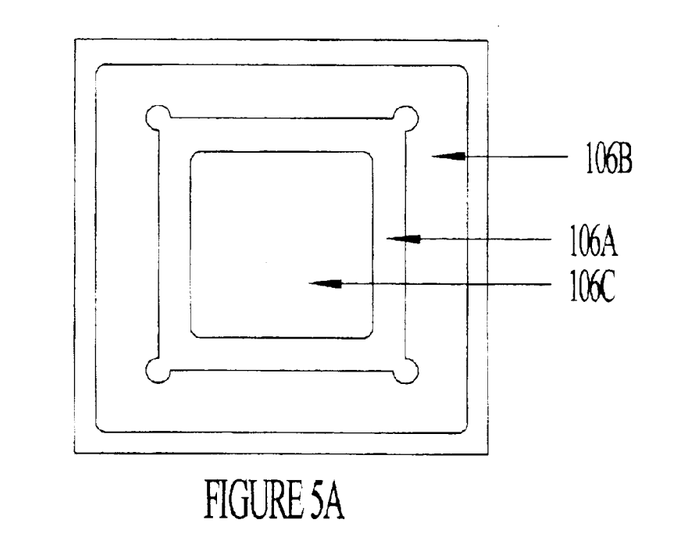
FIG. 5A shows a top view of a BGA nest for holding a BGA package, according to one aspect of the present invention.
Figure 5B:
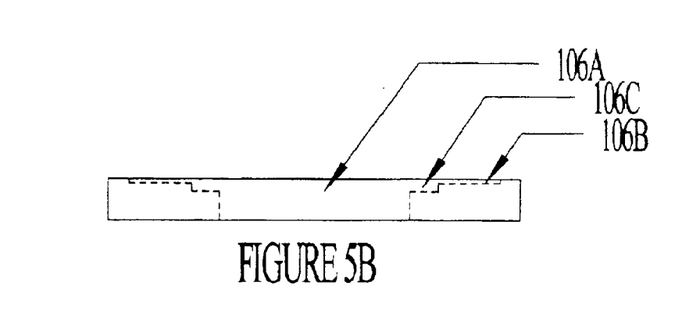
FIG. 5B shows a front view of a BGA nest for holding a BGA package, according to one aspect of the present invention.
Figure 5C:
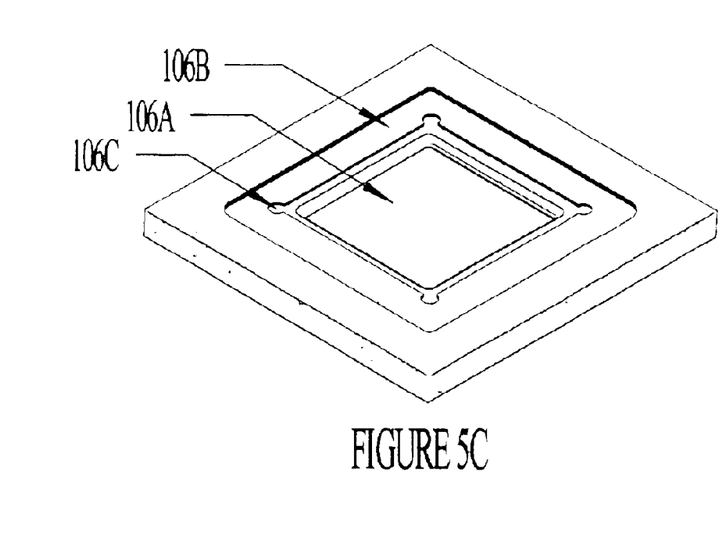
FIG. 5C shows a bottom view of a BGA nest for holding a BGA package, according to one aspect of the present invention.

FIGS. 5A–5C show plural views of BGA nest 106 that is placed in BGA nest holder 103 with BGA package 107 and stencil 108.

FIG. 5A shows a top view of BGA nest 106 with opening 106A that receives BGA package 107 supported on shoulder 106C. Stencil 108 is placed on BGA package 107 and supported on shoulder 106B.

FIG. 5B shows a front view of BGA nest 106 with shoulder 106C for supporting BGA package 107 and shoulder 106B for supporting stencil 108.

FIG. 5C is a bottom view of BGA nest 106 showing BGA nest-opening 106A with shoulders 106B and 106C.

FIGS. 6–12 graphically illustrate the various steps involved in reworking BGA package 107 using system 100, according to one aspect of the present invention.

Figure 6:
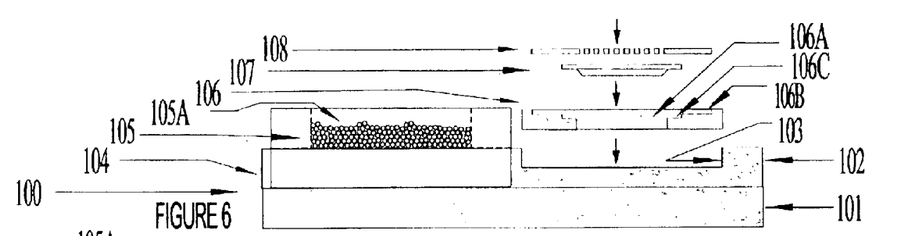
FIGS. 6–12 show various steps involved in the process of reworking a BGA package, according to one aspect of the present invention.

FIG. 6 shows the arrangement of various components of system 100 prior to reworking BGA package 107. BGA nest 106 with BGA nest opening 106A receives BGA package 107, such that BGA package 107 is supported by shoulder 106C. Thereafter, stencil 108 is placed on BGA package 107 and supported by shoulder 106B.

Figure 7:
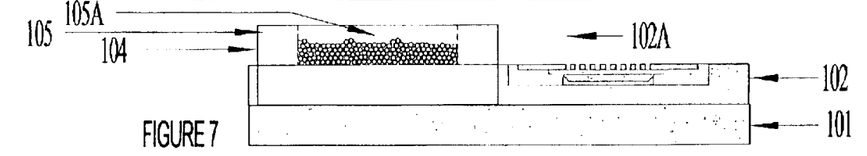

BGA nest 106 with BGA package 107 and stencil 108 is placed in BGA nest holder 103, as shown in FIG. 7.

Figure 8:
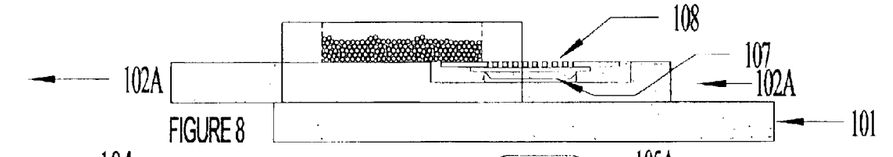

Sliding base 102 with BGA nest 106 containing BGA package 107 and stencil 108 moves in direction 102A towards housing 104, as shown in FIG. 8.

Figures 9, 10:
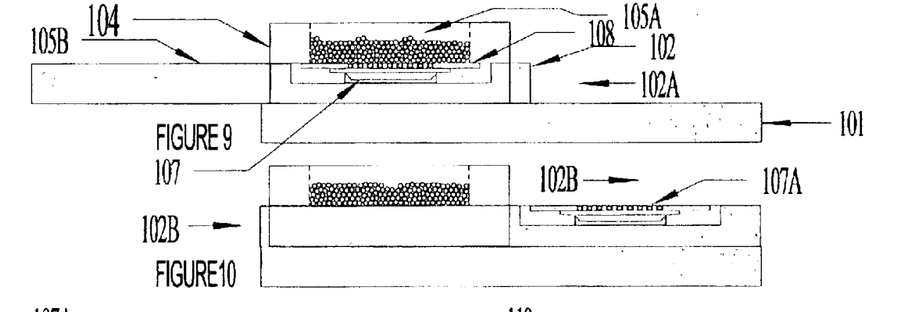

Sliding base plate 102 moves through opening 104A and pushes solder ball compartment base 105B in direction 102A as shown in FIG. 9. This aligns BGA package 107 with solder ball compartment 105. Since solder ball compartment base 105A is pushed, solder balls 105A are placed on BGA package 107 through stencil 108 openings.

Sliding base plate 102 then moves in direction 102B with solder balls 105 on BGA package 107, as shown in FIG. 10.

Figures 11, 12:
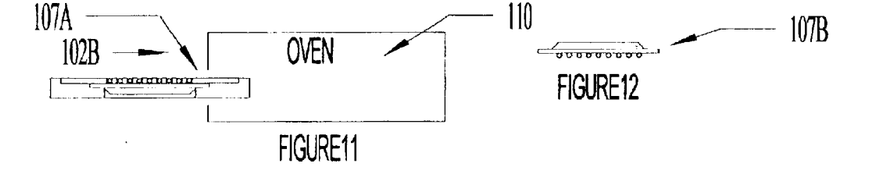

BGA package 107A with solder balls 105 may then be placed in an oven 110 as shown in FIG. 11, resulting in a reworked BGA package 107B.

Figure 13:
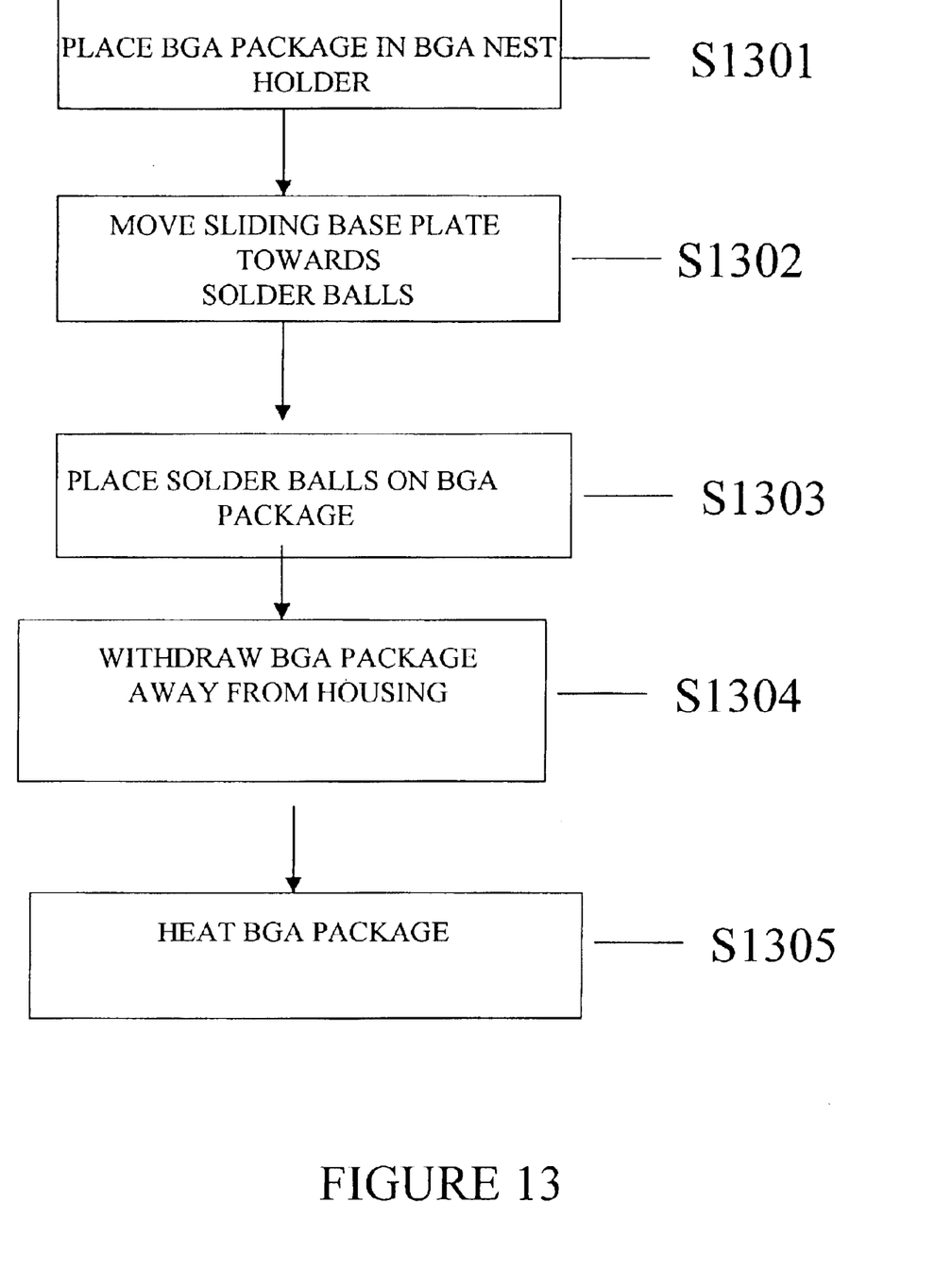
FIG. 13 is a top-level flow diagram showing process steps for reworking BGA packages, according to one aspect of the present invention.

In another aspect of the present invention, FIG. 13 shows a flow diagram for re-working BGA package 107 using system 100.

Turning in detail to FIG. 13, in step S1301, a damaged BGA package 107 with stencil 108, is placed on BGA nest 106, and then placed in BGA nest holder 103. (See FIGS. 6 and 7).

In step S1302, sliding base plate 102 moves into housing 104 via opening 104A. BGA nest holder 103 with BGA package 107 and stencil 108 is aligned with solder ball compartment 105 because solder base plate 105B is pushed in direction 102A by sliding base plate 102 (See FIGS. 8 and 9).

In step S1303, solder balls 105A fill the openings on stencil 108 (FIG. 9). Solder balls 105A via stencil 108, are placed on BGA package 107, filling any vacant sockets on damaged BGA package 107.

In step, S1303 sliding base plate 102 is withdrawn from housing 104 in direction 102B, as shown in FIG. 10.

In step S1304, reballed BGA package 107A may be heated in an oven 110 at predetermined temperatures to permanently solder the balls (105A) to BGA package 107. This results in a reworked BGA package 107B, as shown in FIG. 12.

In one aspect of the present invention, solder balls are not wasted or lost because they are contained in the solder ball compartment.

In another aspect of the present invention, moving the sliding plate is not labor intensive and hence rework of the BGA package is performed efficiently.

Although the present invention has been described with reference to specific embodiments, these embodiments are illustrative only and not limiting. Many other applications and embodiments of the present invention will be apparent in light of this disclosure and the following claims. The invention is intended to cover various modifications and equivalent arrangements within the spirit and scope of the appended claims.

What is claimed is:

1. An apparatus for reworking a Ball Grid Array (BGA) package comprising:
    a housing with a solder ball compartment that includes solder balls;
    a sliding base plate positioned to slide under the solder ball compartment; and
    a BGA nest for supporting the BGA package and a stencil with a hole pattern similar to a solder ball pattern on the BGA package.

2. The apparatus of claim 1, wherein the sliding base plate has a BGA nest holder adapted to receive the BGA nest with the BGA package and the stencil.

3. The apparatus of claim 1, wherein the housing includes a solder base plate that is moved in a first direction by the sliding base plate when the sliding base plate moves underneath the solder base plate in the first direction.

4. The apparatus of claim 1, wherein the sliding base plate with the BGA nest, BGA package and the stencil moves underneath the solder ball compartment such that solder balls are placed on the BGA package through the stencil hole pattern.

5. The apparatus of claim 4, wherein after the solder balls are placed on the BGA package, the sliding plate with the BGA package and the solder balls move in a second direction away from the solder ball compartment.

6. The apparatus of claim 1, wherein the BGA nest includes a first shoulder for supporting the BGA package and a second shoulder for supporting the stencil.

7. The apparatus of claim 1, wherein the housing is covered by a lid.

8. The apparatus of claim 1, wherein the housing includes at least one opening that allows the sliding base plate to move underneath the solder ball compartment.

9. The apparatus of claim 1, further comprising:
    a base plate for supporting the housing and the sliding base plate.

10. A method for reworking a ball grid array (BGA) package comprising:
    placing the BGA package in a BGA nest;
    covering the BGA package with a stencil having a hole pattern similar to a solder ball pattern of the BGA package;
    placing the BGA nest with the BGA package and the stencil in a nest holder of a sliding base plate;
    moving the nest holder with the BGA nest, BGA package and the stencil in a first direction underneath a solder ball compartment of a housing; and
    placing solder balls from the solder ball compartment on the BGA package through the hole pattern of the stencil.

11. The method of claim 10, further comprising:
    moving a solder base plate of the solder base compartment in the first direction, wherein the solder base plate is moved by the sliding base plate.

12. The method of claim 11, further comprising:
    withdrawing the slider base plate in a second direction away from the solder base compartment after solder balls are placed on the BGA package.

* * * * *